Patented June 13, 1950

2,511,013

UNITED STATES PATENT OFFICE 2,511,013

ESTERS OF ANTIMONOUS ACIDS AND METHOD OF PREPARING SAME

John B. Rust, Montclair, and Leonard Spialter, Irvington, N. J., assignors, by direct and mesne assignments, of one-half to Montclair Research Corporation, a corporation of New Jersey, and one-half to Ellis-Foster Company, a corporation of New Jersey No Drawing. Application January 9, 1946, Serial No. 640,132

22 Claims. (Cl. 260—446)

This invention relates to esters of antimonous acids and particularly the halo-esters thereof, to methods of making the same, and to derivatives thereof.

It is known that when ethylene oxide or other organic compound containing the epoxy or oxirane configuration is reacted with an organic acyl halide, of the general type RCOCl, beta chloralkyl esters are formed. It is also known that in certain cases when epoxy compounds are brought into contact with inorganic halides, such as aluminum chloride, tin tetrachloride and the like, polymerization of the epoxy compound occurs often very vigorously, with the formation of tarry or resinous substances. In this latter case, the inorganic halides do not react stoichiometrically with the epoxide to form pure isolatable chemical entities, but act instead as polymerization initiators or catalysts. For example, a trace of tin tetrachloride will polymerize a relatively large amount of ethylene oxide. An exception to this catalytic effect has been noted in the case of arsenic trichloride, wherein trichloroethyl arsenite and certain of its intermediates have been prepared.

Among the objects of the present invention is the production of organic esters of antimonous acids by relatively simple and inexpensive means, thus obtaining compounds having a variety of commercial and technical applications.

Further objects include the production of haloesters of antimonous acids which are capable of being completely or partially hydrolyzed and condensed to polymeric products suitable for use as film forming materials, binders, impregnants, protective coatings, and the like.

Further objects include the production of antimonous esters useful in organic syntheses.

Still further objects include the synthesis of haloalkoxy antimonous halides and related compounds.

Still further objects and advantages of the present invention will appear from the more detailed description set forth below, it being understood that this more detailed description is given by way of illustration and explanation only, and not by way of limitation, since various changes therein may be made by those skilled in the art, without departing from the scope and spirit of the present invention.

In accordance with the present invention it has been found that a reaction between epoxy compounds and antimonous halides may be carried out readily, leading to the progressive formation of haloalkyl or haloaryl or related antimonous halides and conditions can be controlled to determine the characteristics of the product obtained. The derivatives thus formed are readily prepared in relatively short periods of time and obtained in substantial yields.

The epoxide derivative employed may be an epihydrin or a substituted epihydrin, including the epihydrins and substituted epihydrins of both the alkylene and olefinyl type, and in the substituted derivatives the substituent groups may be organic including aliphatic, aromatic, and carbocyclic non-aromatic, such as alkyl, alkenyl, olefinyl, alkynyl, alicylic, aryl, arenyl, arynyl, aralkyl, alkaryl, or may be inorganic including halogen such as chlorine, bromine, hydroxyl, etc. The term "alkynyl" means a univalent radical derived from an alkyne; the terms "arenyl" and "arynyl" cover aralkenyl and aralkynyl respectively. As illustrative of such epihydrins there may be mentioned specifically alkylene oxides such as ethylene oxide, propylene oxide, and the like, as well as epichlorhydrin, butadiene monoxide (3.4 epoxybutene-1), styrene oxide, glycidol, etc. The term "epihydrin" is used herein to cover compounds which are the inner anhydrides (ethers) of dihydric alcohols such as glycols.

The antimonous derivative employed may be an inorganic halo antimonous derivative, or an antimonous halide or an antimonous oxyhalide. The invention will be exemplified hereinafter by antimony trichloride. But it will be understood that other inorganic antimonous halides and oxyhalides may be employed. The inorganic antimonous halides produce beta haloalkoxy antimonous mono- and di-halides, or trisubstituted derivatives where the alkyl or other group is present or substituted derivatives thereof depending on the type of epoxide compound employed in the reaction.

The reaction that takes place may be illustrated by that which takes place between antimony trichloride and ethylene oxide, as follows:

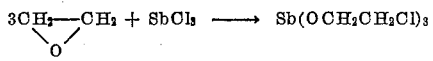

The reactions may occur stepwise along the pattern:

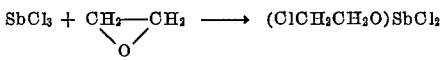

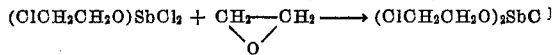

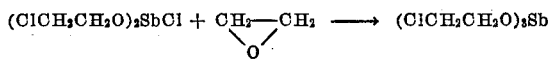

While the invention has been referred to above by the reaction of an individual epihydrin with an individual antimonous halide, mixtures of various reactants may be employed if desired but control of the process is best carried out as further illustrated below in the examples by the use of individual reactants. Nevertheless mixtures of one or more epihydrins may be reacted with one or a mixture of antimonous halides or oxyhalides of the types referred to above, or a single epihydrin may be reacted with a mixture of antimonous derivatives.

Where the reaction involved between particular ingredients is exothermic, the reaction zone may be cooled as by means of an ice bath desirably, however, being carried out under conditions where refluxing still takes place due to the heat formed in the exothermic reaction. With some substituted derivatives and under some operating conditions as illustrated below, the reaction zone may be heated to refluxing temperatures. So that the conditions of reaction including temperature, rate of addition of reactant, presence of refluxing solvent, etc. can be utilized to control and produce the desired reaction.

The reaction may also be controlled by the use of an organic liquid solvent or diluent, inert to the materials undergoing reaction. Such solvent or diluent may be chosen with the desired boiling point and solvent characteristics for the particular reaction being carried out. The solvent or diluent may be selected for example, from any one of the following or mixtures thereof: inert hydrocarbons such as petroleum distillates, hexane, such as n-hexane, toluene, octane, etc., benzene, xylene, etc., or the ethers such as diethyl ether, dibutyl ether, anisole, dioxane, or the esters such as ethyl acetate, or ketones, carbon tetrachloride, carbon disulfide, nitrobenzene and the like.

Any desired feasible way of contacting the reactants may be employed depending on their nature and the conditions under which they are reacted. When the epoxide is a gas, such as ethylene oxide, it may be introduced beneath the surface of the antimonous derivative or its solution in a solvent, as for example, through a sintered ceramic disperser, or as a fine stream of bubbles using efficient stirring. Or the reaction product may be formed continuously by the technique of countercurrent flow, with continuous or discontinuous recovery or removal of reaction product, and with or without recirculation of all or a portion of the reaction mixture through the reaction zone. If a liquid, the epoxide may be slowly added directly, or in one of the solvents referred to above as a diluent, to the antimonous halide or other derivative alone, or with the latter in solution. Or here too, methods involving countercurrent flow may be employed.

The exothermic reactions may be kept under control by one or more of the expedients referred to above as by the use of cooling, or by control of the rate of addition of epoxide, or by the use of the diluent or solvent, or by any combination of such expedients. Where temperatures are employed as explained above under which refluxing takes place, rate of addition of reactant, or use of diluent or solvent, etc., may also be used to control the rate of reaction so as for example, to permit control of the refluxing of the solvent or of other derivatives present.

The reaction of this invention is an addition reaction wherein the epoxide splits at the ring and interposes itself between the antimony and halide atoms. Under properly controlled conditions, side products can be minimized and the reaction carried along smoothly. Desired intermediates, such as beta haloalkoxy antimonous mono- or di-halides may be readily prepared by controlling the ratio of epoxide to the antimonous halide. In the formulations given earlier herein to illustrate the stepwise production of derivatives, such representation should not be construed as limiting, since other mechanisms may be involved and isomer formation may occur. In many cases it has been found that mixtures of the possible isomers are formed. As well as forming the completely reacted esters, the reaction may be interrupted at any desired point in order to obtain the partial esters or an incompletely reacted material which may be desired as an intermediate or for use for other purposes as pointed out hereinabove.

The products formed by reaction of such antimonous halide may be generally formulated as $$Sb.Y_x(OR.Y)_{3-x}$$

where Y is halogen such as chlorine or bromine, R is an alkylene or olefinyl group either substituted or unsubstituted, and $x$ has the value of of 0 to 2.

The products of this invention can be used as such, as intermediates in the preparation of other antimony derivatives, or they may be put to uses analogous to those of other antimonous esters. For example, they may be dissolved in solvents and subjected to partial hydrolysis, or they may be directly subjected to hydrolysis, and the partial hydrolytic and condensation products used as protective coatings, impregnants, adhesives, binders, textile treating agents, fungicides and insecticides, and the like, or they may be mixed with other organo silicon derivatives, organo titanium derivatives, or both and employed in any of the manners set forth.

The following examples illustrate the products and processes of the present invention. All proportions are by weight unless otherwise indicated.

*Example 1.*—In a 3-neck 200 cc. glass reactor, fitted with a dropping funnel, motor-driven stirrer and reflux condenser topped by a calcium chloride drying tube to provide anhydrous reflux, was placed a solution of 31.5 g. (0.14 mole) antimony trichloride in 50 cc. toluene. To this yellow solution was added slowly over a period of 90 minutes with stirring a solution of 29 cc. (0.42 mole) dry propylene oxide in 25 cc. toluene. The first few cc. added caused a strong exothermic reaction and formation of a white precipitate. After the addition, the reaction mixture was heated with stirring by an oil bath maintained at 150° C. for 2 hours. There was then obtained a clear faintly yellow solution of tris (beta chloropropyl) antimonite.

*Example 2.*—Into the apparatus of Example 1, was placed ⅛ mole antimony trichloride. To this was slowly added dropwise with stirring ⅛ mole epichlorohydrin. A rapid strong exothermic reaction occurred with the formation of a dark red viscous liquid. This crude dichloropropyloxy antimony dichloride on exposure to air formed a skin on its surface within one minute.

*Example 3.*—Into the reaction apparatus of Example 1, was charged ⅛ mole antimony trichloride and ⅜ mole epichlorohydrin was then added slowly with vigorous stirring. A strong exothermic reaction occurred and persisted, throughout the addition until near the end. After the addition, the dark viscous liquid product was stirred until it had completely cooled to room temperature. A film of this crude tris (dichloro-propyl) antimonite when poured on glass air-dried within two minutes. It then slowly wrinkled and crumbled to a brown powder.

*Example 4.*—Example 3 was repeated but with a modification in experimental conditions. The epichlorohydrin was added with vigorous stirring over a period of 45 minutes to the antimony trichloride while the reaction flask was well cooled in an ice water bath. There was obtained a suspension of white solid in a liquid. On removing the cooling bath, the temperature of the reaction mixture rose spontaneously and gradually to about 80° C., and then started to drop over a period of one hour. Stirring was continued all the time. When the reaction mixture started to cool, an oil bath was applied and heated at 150° C. for 45 minutes. There was then obtained the tris (dichloro-propyl) antimonite as a clear very light yellow liquid. A film of the material on glass air-set rapidly and then wrinkled and crumbled to powdery flakes.

*Example 5.*—In the reaction flask of Example 1, was placed a solution of 28.5 g. (⅛ mole) antimony trichloride in 40 cc. toluene, and cooled in an ice water bath. To the solution was slowly added 26.3 g. (⅜ mole) butadiene monoxide in 35 cc. toluene with vigorous stirring over a period of 2½ hours. The reaction mixture during the addition slowly turned green in color, and finally a turbid light brown. The cooling bath was removed and the reaction mixture was then allowed to stand in a closed flask at room temperature for 16 hours. At the end of that time, the reaction was complete and there was obtained a clear yellow-orange solution of chlorobutenyl antimonite in toluene.

*Example 6.*—Ethylene oxide gas was bubbled through a sintered ceramic disperser into a solution of 28.5 g. (⅛ mole) antimony trichloride in 20 cc. toluene. An exothermic reaction occurred. The rate of flow of ethylene oxide was adjusted and an ice water cooling bath so used as to keep the temperature of the reaction mixture at about 50–70° C. Ethylene oxide gas flow was maintained until exothermic reaction had ceased and reaction mixture had cooled to room temperature. The product obtained was a clear solution of chloroethyl antimonite in toluene and containing dissolved ethylene oxide.

The toluene and ethylene oxide were removed by distillation under reduced pressure, but attempts then to distill the chloroethyl antimonite resulted in decomposition of the product.

*Example 7.*—Example 6 was repeated, but no cooling bath was used. Instead, the boiling toluene removed the heat of reaction by means of an attached reflux condenser fitted at the top with a CaCl₂ drying tube to provide anhydrous conditions. After 3 hours of passing in ethylene oxide gas, the strongly exothermic reaction ceased and reaction mixture cooled.

Under reduced pressure, the dissolved excess ethylene oxide and toluene solvent were carefully distilled away, yielding clear colorless syrupy chloroethyl antimonite. This product hydrolyzed very readily on expose to moist air to deposit a white incrustation.

In the discussion and disclosures given above, reference has been made to the utilization of an antimonous halide in carrying out the reaction with epoxy derivatives. Such reaction may be carried out utilizing the antimonous halide in admixture with silicon halides to form complex mixtures of complex derivatives because of interreactions and co-reactions of the various ingredients. The silicon derivative employed may be an inorganic halo silane or a silicon halide or a silicon oxyhalide including for example, silicon tetrachloride, silicon tetrabromide, silicochloroform, dichlorosilane, monochlorosilane, silicon oxychloride, disilicon hexachloride, and other polysilicon polyhalides and oxyhalides. The inorganic silicon halides of themselves produce beta halo alkoxy silicon mono-, di-, or tri-halides or substituted derivatives thereof depending on the type of epoxide compound employed in the reaction. Organo substituted silicon halides may be employed in combination with the antimonous halides in which substituted silicon halides the substituent organic group may be selected from the organic radicals mentioned above and may be illustrated by the alkyl silicon halides. The organo silicon halides give derivatives of halo alkoxy alkyl silicon type when they are reacted alone with the epoxy compound but as stated above when mixtures of the silicon halide and antimonous halide are employed, very complex mixtures of several types of derivatives are produced. The reaction conditions for utilizing mixtures of silicon halides with antimonous halides are substantially the same as those discussed above in connection with the specific examples in producing the antimonous derivative. The various conditions there set forth for control of the reaction by the use of liquid solvents or diluents, etc., may also be applied to the production of the complexes where both silicon halides and antimonous halides are reacted. The mixed derivatives produced may be subjected to hydrolysis in the manner described above to further produce hydrolytic or hydrolyzed derivatives of complex character which may be utilized for various purposes. The proportions of the antimonous halide to the silicon halide derivatives employed may vary depending on the nature of the reaction product and the ultimate properties desired. Where the amounts of the antimonous halides are substantially less than those of the silicon halides employed in the reaction, the antimonous derivatives tend to modify the properties of the silicon halide derivatives, whereas when the antimonous derivatives exceed substantially the amount of the silicon derivatives present, it is the antimonous derivatives which give the fundamental character to the derivatives ultimately produced, depending, of course, on the proportions employed.

While the utilization of mixtures of silicon halides and antimonous halides has been set forth above in carrying out the reactions, it is possible also to carry out the reaction with the silicon halide and the epoxy derivative and subsequently mix such derivatives which are produced with the compounds obtained by the reaction of the antimonous halide with the epoxy derivative, proportions being utilized to produce the desired properties in the resulting product. Hydrolyzed or partially hydrolyzed products of each of the silicon and antimonous derivatives may be produced separately and admixed, or cohydrolysis may be carried out.

In an analogous way in lieu of the silicon halides utilized in combination with the antimonous halide for producing mixed derivatives, titanium halides and titanium oxyhalides may be employed in producing mixed derivatives with the antimonous halides and mixtures of antimonous halides with silicon halides and titanium halides may also be employed in carrying out these reactions to produce very complex products. Exactly the same considerations as those set forth above in connection with the production of the mixed derivatives from antimonous halides and silicon halides may be employed in producing these further complex products from the three fundamental reactants.

Here again the individual derivatives may be produced by the epoxy reaction from the antimonous halide, from the silicon halide, and from the titanium halide and such reaction products then mixed and subjected to utilization in any of the manners set forth above for the purposes there given, or they may be hydrolyzed or partially hydrolyzed by cohydrolysis methods as set forth above in producing complex derivatives, or the individual epoxy derived materials may be subjected to hydrolysis or partial hydrolysis and then subsequently mixed. Various combinations of products having controlled characteristics may thus be produced.

The esters of the present invention may also be compounded with hydrolyzed or partially hydrolyzed or condensed alkyl or aryl substituted silicon esters, or substituted silicanols, or their mixtures, for the purposes of bringing about further intermolecular dehydration condensation, by absorbing and reacting with the water being split out, forming desired co-condensation products, and the like.

Having thus set forth our invention, we claim:

1. The method of preparing halo esters of antimonous acids which comprises reacting an antimonous halide with an epoxy compound having the formula

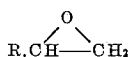

in which R is selected from the group consisting of hydrogen, alkyl, haloalkyl, hydroxyalkyl, alkenyl, and phenyl.

2. The method of preparing halo esters of antimonous acids which comprises reacting an antimonous halide with 1,2 epoxyalkane.

3. The method of preparing halo esters of antimonous acids which comprises reacting an antimonous halide with 1,2 epoxyalkene.

4. The method of preparing halo esters of antimonous acids which comprises reacting an antimonous halide with ethylene oxide while cooling the reaction mixture.

5. The method of preparing halo esters of antimonous acids which comprises reacting an antimonous halide with propylene oxide.

6. The method of preparing halo esters of antimonous acids which comprises reacting an antimonous halide with epichlorhydrin.

7. The method as set forth in claim 1 carried out in the presence of an organic liquid solvent under temperature conditions which produce refluxing.

8. A method as set forth in claim 1 in which the antimonous halide is antimony trihalide.

9. The method as set forth in claim 2 in which the antimonous halide is antimony trihalide.

10. The method as set forth in claim 3 in which the antimonous halide is antimony trihalide.

11. The method as set forth in claim 4 in which the antimonous halide is antimony trihalide.

12. The method as set forth in claim 5 in which the antimonous halide is antimony trihalide.

13. The method as set forth in claim 6 in which the antimonous halide is antimony trihalide.

14. The method of preparing halo esters of antimonous acids which comprises passing ethylene oxide into antimony trichloride at temperatures of from 50 to 70° C. until exothermic reaction ceases and recovering the chloro ethyl antimonite reaction product formed.

15. The method of preparing halo esters of antimonous acids which comprises passing ethylene oxide into a solution of antimony trichloride in toluene under refluxing conditions until exothermic reaction ceases, and recovering the chloro ethyl antimonite reaction product formed.

16. An organo antimonous derivative having the formula $SbY_x(OCH_2CHR.Y)_{3-x}$ where R is selected from the group consisting of hydrogen, alkyl, haloalkyl, hydroxyalkyl, alkenyl and phenyl, Y is halogen, and $x$ is an integer from 0 to 2.

17. A reaction product as set forth in claim 16 including a beta chloropropyl antimonite.

18. A reaction product as set forth in claim 16 including a beta chloroethyl antimonite.

19. A reaction product as set forth in claim 16 including a dichloro propyl antimonite.

20. A reaction product as set forth in claim 16 including tris (beta chloropropyl) antimonite.

21. A reaction product as set forth in claim 16 including tris (beta chloroethyl) antimonite.

22. A reaction product as set forth in claim 16 including tris (dichloro propyl) antimonite.

JOHN B. RUST.
LEONARD SPIALTER.

REFERENCES CITED

The following references are of record in the file of this patent:

UNITED STATES PATENTS

| Number | Name | Date |
| --- | --- | --- |
| 1,725,620 | Cunradi et al. | Aug. 20, 1929 |
| 1,815,979 | Kille et al. | July 28, 1931 |
| 1,944,274 | Salzberg | Jan. 23, 1934 |
| 2,242,400 | Loone et al. | May 20, 1941 |
| 8,381,138 | Patnode | Aug. 7, 1945 |

FOREIGN PATENTS

| Number | Country | Date |
| --- | --- | --- |
| 582,412 | France | Dec. 18, 1924 |

OTHER REFERENCES

Morgan: "Organic Compounds of Arsenic and Antimony" (1918), pp. xi–xii and 20–28.

Goddard: "Textbook of Inorganic Chemistry," ed. by Friend: vol. XI, pt. II, pages 5 and 7 (1930); vol. XI, pt. III, page 166 (1936).

Taurke: Berichte de Den Chem., vol. 38 (1905), page 1661.

Pickard et al.: Jour. Chem. (London), vol. 91 (1907), pages 901 and 2.

Von Euler: Chemical Abstracts, vol. 23, page 4227.

Malinovske: J. Gen. Chem. (USSR), 10 (1940), C. A. 35, 4736 (1941), pages 1918–22.